United States Patent [19]

Crudup et al.

[11] Patent Number: 5,052,435
[45] Date of Patent: Oct. 1, 1991

[54] PUMP VALVE

[75] Inventors: Steven E. Crudup, 419 Dodson Lake Dr., Arlington, Tex. 76102; Emmett T. Roberts, Houston, Tex.

[73] Assignee: Steven E. Crudup, Arlington, Tex.

[21] Appl. No.: 565,617

[22] Filed: Aug. 9, 1990

[51] Int. Cl.⁵ .............................................. F16K 15/06
[52] U.S. Cl. ........................... 137/516.29; 137/543.23; 251/332
[58] Field of Search ...................... 137/516.29, 533.21, 137/543.23, 902; 251/332

[56] References Cited

U.S. PATENT DOCUMENTS

| | | | |
|---|---|---|---|
| 1,692,795 | 11/1928 | Clifford . | |
| 1,705,800 | 3/1929 | Akeyson | 251/332 |
| 1,716,896 | 6/1929 | Miller | 137/902 |
| 2,107,200 | 2/1938 | Kennon | 251/332 |
| 2,260,381 | 10/1941 | Kennon . | |
| 3,057,372 | 10/1962 | Sutton | 137/516.29 |
| 3,074,425 | 1/1963 | Kikendall . | |
| 3,191,617 | 6/1965 | Maddox | 251/332 X |
| 3,324,880 | 6/1967 | Roberts et al. | 137/516.29 |
| 3,532,115 | 4/1968 | Hodil Jr. | 137/516.25 |
| 3,605,793 | 7/1969 | Kinsel . | |
| 4,074,694 | 2/1978 | Lee . | |
| 4,180,097 | 12/1979 | Sjoberg | 137/516.29 |
| 4,479,508 | 10/1984 | Breed | 137/516.25 |
| 4,951,707 | 8/1990 | Johnson | 251/332 X |

FOREIGN PATENT DOCUMENTS 71885  4/1959  France ......................... 251/332

Primary Examiner—Robert G. Nilson
Attorney, Agent, or Firm—Ned L. Conley

[57]  ABSTRACT

A reciprocating pump valve and seat having mating frustoconical seating surfaces in which a resilient sealing insert on the valve is below a rigid disc portion of the valve, with a sealing surface on the insert engageable with the seating surface of the seat radially outwardly from the portion of the seating surface of the seat engageable by the rigid disc portion of the valve.

4 Claims, 2 Drawing Sheets

PUMP VALVE

FIELD OF THE INVENTION

This invention relates to valves for reciprocating pumps, and particularly for high speed, high pressure reciprocating pumps such as are used for injecting fluids into oil and gas wells.

BACKGROUND OF THE INVENTION

After the drilling of an oil or gas well is completed, it is often necessary or desirable to pump certain fluids into the well to obtain improved production. For example, acids are sometimes pumped into a well to dissolve certain solids which impair production. Formations are fractured by pumping liquid at high pressure into the well, and fractures are held open by solid particles, such as sand, which are pumped into the well. High pressure pumps are also required for pumping cement into wells to cement casing in place.

High pressure reciprocating pumps are usually used for pumping such materials into the wells. Such pumps usually have two or more cylinders, and may operate at pressures of 10,000 pounds per square inch (psi), or more, up to as high as 25,000 psi. In addition, they often operate at very high speeds, up to 1000 strokes per minute.

The combination of corrosive or abrasive materials, high pressure and high speed constitutes very severe operating conditions for the valves used in these pumps. These valves consist of replaceable poppet-type valve bodies which seat on replaceable seats in the pump fluid end. The valve body usually includes a metal disk which seats on the seat, and a resilient insert which sealingly engages the seat. The seat is pressed or screwed into the valve deck in the fluid end of the pump, and provides an axial flow passage for the pumped fluid. The seat includes a guide surface to receive a valve guide which may consist of a lower stem extending axially downwardly from the valve body and engages a guide surface provided by a web in the seat or a "crowfoot" type guide which engages the inner circumference of the seat.

In a conventional valve design, such as that shown in U.S. Pat. No. 3,324,880, for example, the valve seat has an upwardly facing annular frusto-conical seating face surrounding the flow passage, and the disc of the valve body has a corresponding downwardly facing annular frusto-conical seating surface which supports the valve on the seat when the valve is in closed position. A resilient insert, usually made of a material such as polyurethane, is carried on top of the disc of the valve, and has a downwardly facing annular frusto-conical sealing surface positioned to sealingly engage the outer portion of the frusto-conical seating face of the seat.

On each pressure stroke the pressure created by the pump's piston forces the valve upwardly to an open position. When the pressure stroke is completed, the valve is forced downwardly by pressure from one or more other cylinders, and in some cases by a spring on top of the valve, until the valve strikes the seat, and the insert sealingly engages the seat.

The high operating speed makes inertia of the valve an important factor, since it is important that the valve be closed when the suction stroke begins; otherwise, the pressure on top of the valve will slam it down onto the valve seat with a very high force. This creates a high stress in the valve body as well as high bearing loads on the valve body and the seat. As a result, wear of the seating surfaces is accelerated. Wear is further accelerated as solid particles such as sand are trapped between the seating surfaces. In addition, repeated blows on the seat deform the inner edge of the seating surface, pushing it inwardly. This makes it necessary to bevel the inside circumference of the seating area.

In conventional valve designs, the metal disc portion of the valve body is below the insert, and engages the radially inner portion of the seating face of the seat, with the insert on top of the disc, engaging the radially outer portion of the seating surface. Solid particles between the metal seating surfaces of these valves tend to prop these surfaces apart, creating a gap into which the resilient insert may be forced by the pressure on top of the valve. When the resilient material is forced between the seating surfaces of the valve and seat, the material is pinched and chewed, reducing its ability to maintain a seal and accelerating failure.

In addition to the wear resulting from the impact of the metal valve body on the seat and that caused by solid particles trapped between the seating surfaces, erosion by abrasive particles carried by the fluid flowing through the open valve causes wear to the seating surfaces.

Another problem encountered when the resilient insert is carried on top or on the periphery of the valve is that it is sometimes torn away by the force of the flowing fluid and pumped down into the well, where it can cause considerable damage due to blocking bit jets, perforating holes, and the like. Such blockage can make it necessary to rework a well, sometimes at a cost of hundreds of thousands of dollars. If it is not lost in this way, the outer edge of the insert may be bulged out, so that its diameter is increased so much that the valve can't be removed through the valve pot opening.

Because of the wear suffered by valves in this service, it is not uncommon for valves to wear out in from one to eight hours. Wear is so severe on the metal parts that it is not economical to try to recondition them. In order to try to avoid time-consuming, expensive shutdowns during treatment of a well, the usual practice is to open up the pump and replace all the valves every day before operations are started.

SUMMARY OF THE INVENTION

It is an object of the present invention to provide a pump valve which will have substantially improved wear resistance as compared to valves of the prior art. According to this invention, a valve is provided in which the flexible insert engages the seating face of the seat radially inwardly of the engagement area of the metal disc seating surface of the valve body.

This invention takes into account the fact that a major portion of the wear of the metallic seating surfaces of the valve disc and the seat is due to the pounding of the valve on the seat every time the valve closes, and the further fact that this wear rate is inversely proportional to the impact area, that is, the area of engagement between the metal surfaces. At the same time, the invention utilizes the fact that the sealing effectiveness of the resilient insert is improved by increasing the distance between the upstream side and the downstream side of the seal. The impact area and the sealing distance are both limited, however, by the available area for the seating face of the seat.

According to this invention, both the wear resistance of the seating surfaces and the sealing effectiveness of the insert are enhanced without increasing the size of the seating face of the seat. This is accomplished by positioning the disc portion of the valve body above the insert, so that the metallic seating surface of the valve body engages the radially outer portion of the frusto-conical seating face of the seat, and the resilient insert engages the radially inner portion of the seating face of the seat. In this manner, the seating area can be increased as much as fifty percent, by taking advantage of the larger area of the radially outer portion of the frusto-conical seating face, without reducing the radial length of the sealing engagement of the insert. As a result, the wear rate of the metallic seating surfaces is significantly reduced. A further advantage of this arrangement is that fluid pressure on top of the valve during the suction stroke cannot force the resilient insert between the two metal parts where it can be pinched and chewed.

In a preferred embodiment of the invention, the insert is secured, for example by a mechanical or chemical bond or by an adhesive, in a groove in the lower face of the disc portion of the valve body. As a result, the possibility that the insert will be torn loose by the flowing fluid and pumped into the well is substantially reduced.

The valve guides of the invention are preferably made of a polymeric material to reduce the weight of the valve body and therefore increase its frequency response. As a result, the inertia of the valve is reduced and it is more likely to close quickly upon reversal of pressure. To reduce wear of the valve guides, wear-resistant inserts are embedded in the legs. These inserts may be made of tungsten carbide, ceramic, or other wear-resistant materials known in the art. The use of such inserts allows much closer clearance between the legs and the guide surface of the seat, thereby providing more accurate guiding of the valve in the seat, so that their conical engaging surfaces are more accurately matched. In addition, the risk of sand packing between the legs and the guide surface with resultant locking of the valve is reduced.

Another advantage of the polymeric material for the guide legs is that they can be molded in a variety of shapes, such as in the shape of vanes, so the valve will be rotated by the fluid flow, thereby promoting uniformity of wear.

DESCRIPTION OF THE PREFERRED EMBODIMENTS

Figure 1:
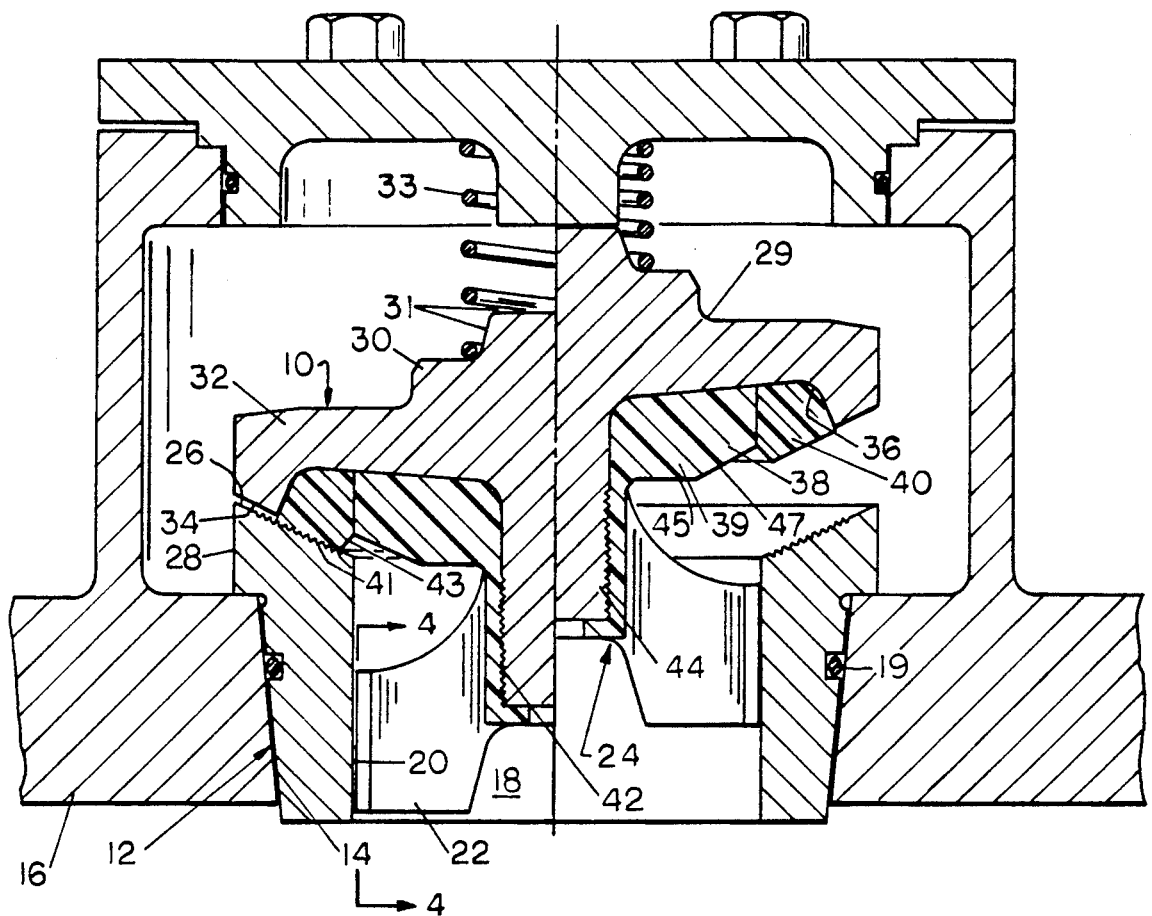
FIG. 1 is a vertical sectional view of a pump valve pot containing a preferred embodiment of a pump valve according to this invention.
Figure 2:
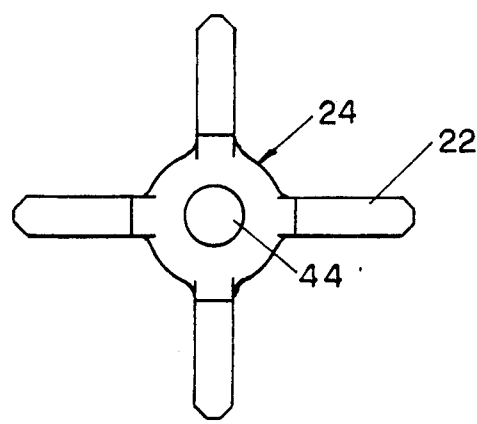
FIG. 2 is a bottom view of the valve of FIG. 1.

As shown in FIG. 1 of the drawing, a valve 10 according to a preferred embodiment of the invention is concentrically disposed in a valve seat 12. The seat is made of a suitable metal known in the art for such uses, such as hardened steel, and is supported in a tapered opening 14 in the valve deck 16 of a reciprocating pump. It will be appreciated that the pumps in which the valves of this invention are used will have two, three or more cylinders, and that each cylinder will have two valves, a suction valve and a discharge valve. This description will be in terms of a discharge valve, but the valves of this invention are equally usable as both suction and discharge valves, and in fact are used interchangeably.

The seat has a central flow passage 18 defined by a cylindrical wall 20 which also functions as a guide surface for the legs 22 of the valve guide 24. An 0-ring 19 provides a fluid-tight seal between the seat and the valve deck. The upper end of the flow passage flares outwardly, being defined by an annular frusto-conical seating face 26 which extends to the upper end of the seat. The seating face 26 may have a phonograph finish (exaggerated in the drawing) of from about 125 to 16 rms. The upper end of the seat is circumscribed by a small flange 28 which limits the distance the seat can be driven into the valve deck opening 14.

The valve comprises a valve body 29 made of hardened steel or other material known in the art as suitable for such applications, and includes a central hub 30 having formed integrally therewith a disc or flange 32 whose outer diameter is substantially the same as the outer diameter of seating face 26, and a spring guide 31 to receive the lower end of a compression spring 33 which biases the valve downwardly. A frusto-conical seating surface 34 is formed on the lower face of the disc 32, extending downwardly and inwardly from the outer diameter, and having an included angle approximately the same as the included angle of the sealing face 26 on the seat.

Figure 3:
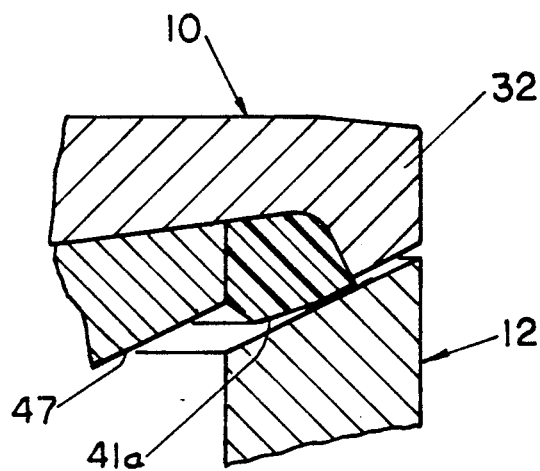
FIG. 3 is a fragmented view of another embodiment of a valve according to this invention.

An annular insert groove 36 is formed in the lower face of the disc 32, with the circumference of a flange 38 on a leg support member 39 forming an inner wall of the groove. A resilient annular insert or seal member 40 is secured in the groove by bonding or an adhesive or the like. The insert 40 is made of a suitable material known in the art for valve inserts, as for example polyurethane having a hardness preferably in the range of about 90 to 95 durometer on the Shore A scale, and has a frustoconical sealing face 41 which may have an included angle substantially equal to the included angle of the seating face 26 of the seat. Alternatively, the sealing surface may have an included angle up to about five degrees greater than the seating face angle, as shown at 41a in FIG. 3. This leaves an opening between the inner edge of the insert and the seat when the seal is first formed, and reduces the amount of elastomer which flows radially when the valve is closed. The insert is proportioned so that its outer edge extends below the seating surface 34, for example up to about 0.04 inch, so that when the valve closes the insert contacts the seat first and can provide a sealing engagement. Upon complete closing of the valve, the insert is deformed, and pressure above the valve tends to cause the insert material to flow radially inwardly. When the included angle of the valve sealing surface is greater than the included angle of the valve seat seating face 26, the outer edge of the insert contacts the seating fact first, leaving a gap into which the insert material can flow radially inwardly as the insert is compressed.

The inner circumference of the insert sealing surface is preferably beveled at 43 one-sixteenth to one-quarter inch, so that the inner circumference of the sealing surface is larger than the inner circumference of the seating face 26. The lower face 45 of the leg support member 39 is also beveled at its outer edge to a corresponding degree, so that when the valve is fully closed this beveled surface 47 is spaced away from the radially inner portion of the seating face 26, leaving a gap of from about one-sixteenth to three-sixteenths inch into which the insert material can flow. The inner edge of the insert is therefore not pinched between the valve body and the seat when the insert is under pressure.

Figure 4:
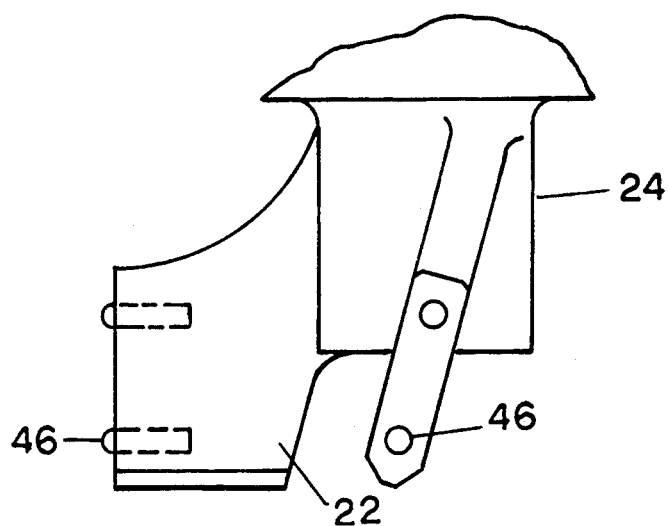
FIG. 4 is a fragmented view of a portion of another valve according to this invention.

Valve guide 24 is of the "crowfoot" type, having three, four or more legs 22, and is provided with a central bore 42 mounted on a lower stem 44 on the valve body. The legs support wear resistant inserts or buttons 46 positioned to engage the guide surface 20. These buttons may have a clearance of 0.005 to 0.015 inch from the guide surface. The guide is preferably made of a polymeric material, such as polyurethane, of a fairly rigid type, e.g. 70 to 80 durometer on the Shore D scale. Although the legs shown are straight, they may also be twisted, to form vanes, as shown in FIG. 4, so that the fluid flowing through the valve seat flow passage will impart a rotational force to the valve. Rotation of the valve during operation will promote uniformity of wear, and therefore prolong the life of the valve.

The valve guide 24 is pressed on the lower stem 44 of the valve body, and the stem may have a phonograph groove (exaggerated in the drawing) having a surface finish of from about 125 to 63 rms to better grip the valve guide.

The phonograph finish on the seating face 26 serves to inhibit radial flow of the insert material when the valve is under pressure in the closed position.

The valve of this invention is much more durable in high pressure, high speed pumps. Using the radially outer portion of the seating face of the seat to receive the impact of the valve body flange allows a much larger impact area, without sacrificing the radial length of the seal obtained between the insert and the seating face. When the valve of this invention replaces the valve of U.S. Pat. No. 3,324,980, the striking area can be more than doubled, without reducing the radial length of the seal. Thus the invention makes it possible to balance optimum seal length and optimum wear area.

Encasing the insert in a groove formed between the outer annular portion of the valve body flange and an inner support positions the insert so it cannot be blown out of the valve, and therefore cannot plug down-hole valves or other devices.

Because of the lighter weight of the material used for the valve guide portion of the valve, the valve is much lighter so that it has better frequency response at high speeds. The guide portion is also replaceable, if it happens to fail in service. The use of the wear-resistant buttons on the legs allows closer fitting between the legs and the valve seat, within 0.005 to 0.015 inch, thereby substantially improving the guiding of the valve. Such a close fit without the buttons could result in jamming of the valve because of sand packing.

Although preferred embodiments of the invention have been shown and described, the invention is not limited to these embodiments, but includes all variations within the scope of the following claims.

I claim:

1. A reciprocating pump valve for use in a valve seat having a central flow passageway, a cylindrical valve guide surface and an upwardly facing frustoconical seating face surrounding said flow passageway, comprising
a rigid valve body having a downwardly facing frustoconical annular seating surface having substantially the same included angle as the radially outward portion of the seating face of the valve seat and engageable with the seating face when the valve is closed on the seat,
a downwardly facing annular groove in said valve body adjacent and radially inward from said seating surface,
a resilient seal member secured in said groove,
said seal member having a downwardly facing frustoconical sealing surface positioned to engage the seating face of the seat when the valve is closed on the seat, the cone of said sealing surface having a greater included angle than the cone of the valve body seating surface and the outer edge of said sealing surface extending below the seating surface so that when the valve closes on the seat the seal member engages the seating face before the seating surface engages the seating face, and
a centrally disposed guide affixed to said valve body and extending downwardly therefrom, said guide having a plurality of wear resistant inserts positioned to engage the guide surface of the seat during movement of the valve relative to the seat.

2. A reciprocating pump valve for use in a valve seat having a wall defining a flow passage and an upwardly facing frustoconical annular seating face surrounding the upper end of said wall, comprising
a rigid valve body having a downwardly facing frustoconical annular seating surface having substantially the same included angle as the radially outward portion of the seating face of the valve seat and engageable with the seating face when the valve is closed on the seat,
a downwardly facing annular groove in said valve body adjacent and radially inwardly from said seating surface,
a resilient seal member secured in said groove, said seal member having a downwardly facing frustoconical sealing surface positioned to engage the seating face of the seat when the valve is closed on the seat, the outer edge of said sealing surface extending below the valve body seating surface so that when the valve closes on the seat the seal member engages the seating face before the seating surface engaged the seating face,
and a centrally disposed guide affixed to said valve body and extending downwardly therefrom, said guide having a plurality of wear resistant inserts positioned to engage the seat wall to guide the vertical movement of the valve in the seat.

3. A pump valve as defined by claim 2 in which the guide is formed from a molded polymeric material and includes a flange portion forming a portion of the valve body which forms a wall of the groove in which seal member is secured.

4. A reciprocating pump valve for use in a valve seat having a central flow passageway, a cylindrical valve guide surface and an upwardly facing seating face surrounding said flow passageway, comprising
a valve body having a downwardly facing annular seating surface engageable with the seating face when the valve is closed on the seat,
a resilient seal member secured to said valve body,
said seal member having a downwardly facing sealing surface positioned to engage the seating face of the seat when the valve is closed on the seat, and
a centrally disposed guide affixed to said valve body and extending downwardly therefrom, said guide having a plurality of wear resistant inserts positioned to engage the guide surface of the seat during movement of the valve relative to the seat.

* * * * *